United States Patent
Hong et al.

(10) Patent No.: US 10,340,087 B2
(45) Date of Patent: *Jul. 2, 2019

(54) MULTILAYER ELECTRONIC COMPONENT HAVING FIRST INTERNAL ELECTRODE BASE PATTERNS EXPOSED TO AN END AND OPPOSING SIDE SURFACES OF A BODY, AND METHOD OF MANUFACTURING THE SAME

(71) Applicant: SAMSUNG ELECTRO-MECHANICS CO., LTD., Suwon-si, Gyeonggi-do (KR)

(72) Inventors: Yong Min Hong, Suwon-si (KR); Ki Pyo Hong, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,244

(22) Filed: May 2, 2018

(65) Prior Publication Data
US 2018/0254146 A1  Sep. 6, 2018

Related U.S. Application Data

(63) Continuation of application No. 15/216,151, filed on Jul. 21, 2016, now Pat. No. 10,090,107.

(30) Foreign Application Priority Data

Dec. 29, 2015  (KR) ........................ 10-2015-0188415

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/005* (2013.01); *H01G 4/012* (2013.01); *H01G 4/12* (2013.01); *H01G 4/232* (2013.01)

(58) Field of Classification Search
CPC .......... H01G 4/30; H01G 4/232; H01G 4/012; H01G 4/12
See application file for complete search history.

(56) References Cited

U.S. PATENT DOCUMENTS 9,123,472 B2  9/2015  Kim
2010/0025075 A1*  2/2010  Feichtinger ............ H01C 1/142
                                                                174/126.1
(Continued)

FOREIGN PATENT DOCUMENTS

CN  102683015 A  9/2012
JP  08181035 A  7/1996
(Continued)

OTHER PUBLICATIONS

Non-Final Office Action issued in U.S. Appl. No. 15/216,151, dated Sep. 29, 2017.
(Continued)

*Primary Examiner* — David M Sinclair
(74) *Attorney, Agent, or Firm* — Morgan, Lewis & Bockius LLP (57) ABSTRACT

A multilayer electronic component and a method of manufacturing the same are provided. The multilayer electronic component includes a body including a multilayer structure in which first internal electrode patterns and second internal electrode patterns different from the first internal electrode patterns are alternately stacked and containing a dielectric material. First and second side parts are disposed on respective outer surfaces of a first pair of opposing outer surfaces of the body. First and second external electrodes are disposed on respective outer surfaces of a second pair of
(Continued)

opposing outer surfaces of the body, and the first and second external electrodes are electrically connected to the first and second internal electrode patterns, respectively. The first internal electrode patterns are exposed to the outer surfaces of the first pair of outer surfaces of the body on which the first and second side parts are disposed.

26 Claims, 9 Drawing Sheets

(51) Int. Cl.
*H01G 4/12* (2006.01)
*H01G 4/005* (2006.01)
*H01G 4/232* (2006.01)

(56) References Cited

U.S. PATENT DOCUMENTS

| | | | |
|---|---|---|---|
| 2012/0147515 A1 | 6/2012 | Kim et al. | |
| 2012/0229949 A1 | 9/2012 | Kim | |
| 2013/0135787 A1 | 5/2013 | Lim et al. | |
| 2014/0362492 A1 | 12/2014 | Lee et al. | |
| 2015/0083315 A1 | 3/2015 | Tanaka | |

FOREIGN PATENT DOCUMENTS

| | | | |
|---|---|---|---|
| JP | 11-340089 A | | 12/1999 |
| JP | 2002170736 A | * | 6/2002 |
| JP | 2004-179436 A | | 6/2004 |
| JP | 2005-108890 A | | 4/2005 |
| JP | 2012190874 A | | 10/2012 |
| JP | 2013165211 A | | 8/2013 |
| JP | 2015-076591 A | | 4/2015 |

OTHER PUBLICATIONS

Final Office Action issued in U.S. Appl. No. 15/216,151, dated Feb. 7, 2018.
Final Office Action issued in U.S. Appl. No. 15/857,452, dated Jul. 16, 2018.
First Office Action issued in Chinese Patent Application No. 201610694594, dated Jul. 19, 2018 (English translation).

* cited by examiner

MULTILAYER ELECTRONIC COMPONENT HAVING FIRST INTERNAL ELECTRODE BASE PATTERNS EXPOSED TO AN END AND OPPOSING SIDE SURFACES OF A BODY, AND METHOD OF MANUFACTURING THE SAME

CROSS-REFERENCE TO RELATED APPLICATIONS

This application is a continuation of U.S. patent application Ser. No. 15/216,151, filed Jul. 21, 2016 which claims the priority and benefit of Korean Patent Application No. 10-2015-0188415, filed on Dec. 29, 2015 with the Korean Intellectual Property Office, the disclosures of both are incorporated herein by reference.

BACKGROUND

The present disclosure relates to a multilayer electronic component and a method of manufacturing the same, and more particularly, to a multilayer ceramic capacitor and a method of manufacturing the same.

A multilayer ceramic capacitor may include a multilayer structure formed by stacking a plurality of sheets containing dielectric materials, external electrodes formed on outer surfaces of the multilayer structure and having different polarities, and internal electrodes alternately stacked within the multilayer structure and connected to the external electrodes.

The internal electrodes are formed between adjacent pairs of sheets of the plurality of sheets, and adjacent internal electrodes are connected to different polarity external electrodes in order to generate capacitive coupling, such that the multilayer ceramic capacitor has a capacitance value.

Recently, in order to increase capacitance of the multilayer ceramic capacitor and miniaturize the multilayer ceramic capacitor, various attempts have been made to slim or reduce the thickness of dielectric sheets. The slimming of the dielectric sheets may increase the number of stacked dielectric sheets. Attempts have further been made to optimize a margin part of a body having a multilayer structure in order to secure an overlapping area between the internal electrodes.

SUMMARY

An aspect of the present disclosure may provide a multilayer electronic component in which maximum coverage securing capacitance in internal electrode patterns and in which short circuits between internal electrode patterns may be prevented, and a method of manufacturing the same.

According to an aspect of the present disclosure, a multilayer electronic component may include a body, first and second side parts, and first and second external electrodes. The body includes a multilayer structure in which first and second internal electrode patterns are alternately stacked, and contains a dielectric material. The first and second side parts are disposed on respective outer surfaces of a first pair of opposing outer surfaces of the body. The first and second external electrodes are disposed on respective outer surfaces of a second pair of opposing outer surfaces of the body, and the first and second external electrodes are electrically connected to the first and second internal electrode patterns, respectively. The first internal electrode patterns are different from the second internal electrode patterns, and are exposed to the outer surfaces of the first pair of outer surfaces of the body on which the first and second side parts are disposed.

According to another aspect of the present disclosure, a method of manufacturing a multilayer electronic component may include forming first and second ceramic green sheets using a slurry containing a powder having a dielectric property, a binder, and a solvent. A first internal electrode base pattern is printed on one surface of the first ceramic green sheet. A second internal electrode base pattern is printed on one surface of the second ceramic green sheet such that a margin region of the second ceramic green sheet remains free of the second internal electrode base pattern. The margin region includes two end portion regions of the second ceramic green sheet opposite to each other in a width direction of the second ceramic green sheet and at least a partial region between the two end portion regions of the second ceramic green sheet. The second internal electrode base pattern is different from the first internal electrode base pattern. The first ceramic green sheet including the first internal electrode base pattern is stacked with the second ceramic green sheet including the second internal electrode base pattern to form a multilayer bar. The multilayer bar in which the first and second ceramic green sheets are stacked is cut to form bodies including a multilayer structure in which first and second internal electrode patterns are stacked and containing a dielectric material. First and second side parts are disposed on a first pair of opposing outer surfaces of each body of the bodies formed by the cutting. Further, first and second external electrodes are disposed on a second pair of opposing outer surfaces of each body.

According to a further aspect of the present disclosure, a multilayer electronic component includes a multilayer structure, and first and second side parts and first and second external electrodes disposed on respective outer surfaces of the body. The multilayer structure includes pluralities of first internal electrode patterns and second internal electrode patterns different from the first internal electrode patterns that are alternately stacked, and the multilayer structure contains a dielectric material. Each of the plurality of first internal electrode patterns extends to at least three outer surfaces of the multilayer structure, and each of the plurality of second internal electrode patterns extends to only one outer surface of the multilayer structure.

According to another aspect of the present disclosure, a multilayer electronic component includes a ceramic body, first and second side parts, and first and second external electrodes. The ceramic body includes a dielectric material and pluralities of first internal electrode patterns and second internal electrode patterns different from the first internal electrode patterns alternately stacked in the dielectric material. The ceramic body has four side surfaces and a bottom surface and a top surface. The first and second side parts are disposed on two opposing side surfaces of the ceramic body among the four side surfaces. The first and second external electrodes are disposed on the two remaining opposing side surfaces of the ceramic body. Each of the plurality of first internal electrode patterns extends to the two opposing side surfaces of the ceramic body and only one of the two remaining opposing side surfaces of the ceramic body, and each of the plurality of second internal electrode patterns extends to the other one of the two remaining opposing side surfaces of the ceramic body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another member, component, region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's positional relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present disclosure will be described with reference to schematic views illustrating embodiments of the present disclosure. In the drawings, components having ideal shapes are shown. However, variations from these shapes, for example due to variability in manufacturing techniques and/or tolerances, also fall within the scope of the disclosure. Thus, embodiments of the present disclosure should not be construed as being limited to the particular shapes of regions shown herein, but should more generally be understood to include changes in shape resulting from manufacturing methods and processes. The following embodiments may also be constituted by one or a combination thereof.

The present disclosure describes a variety of configurations, and only illustrative configurations are shown herein. However, the disclosure is not limited to the particular illustrative configurations presented herein, but extends to other similar/analogous configurations as well.

Hereinafter, a multilayer electronic component and a method of manufacturing the same according to an exemplary embodiment will be described. However, the present disclosure is not necessarily limited thereto.

Multilayer Electronic Component

Figure 1:
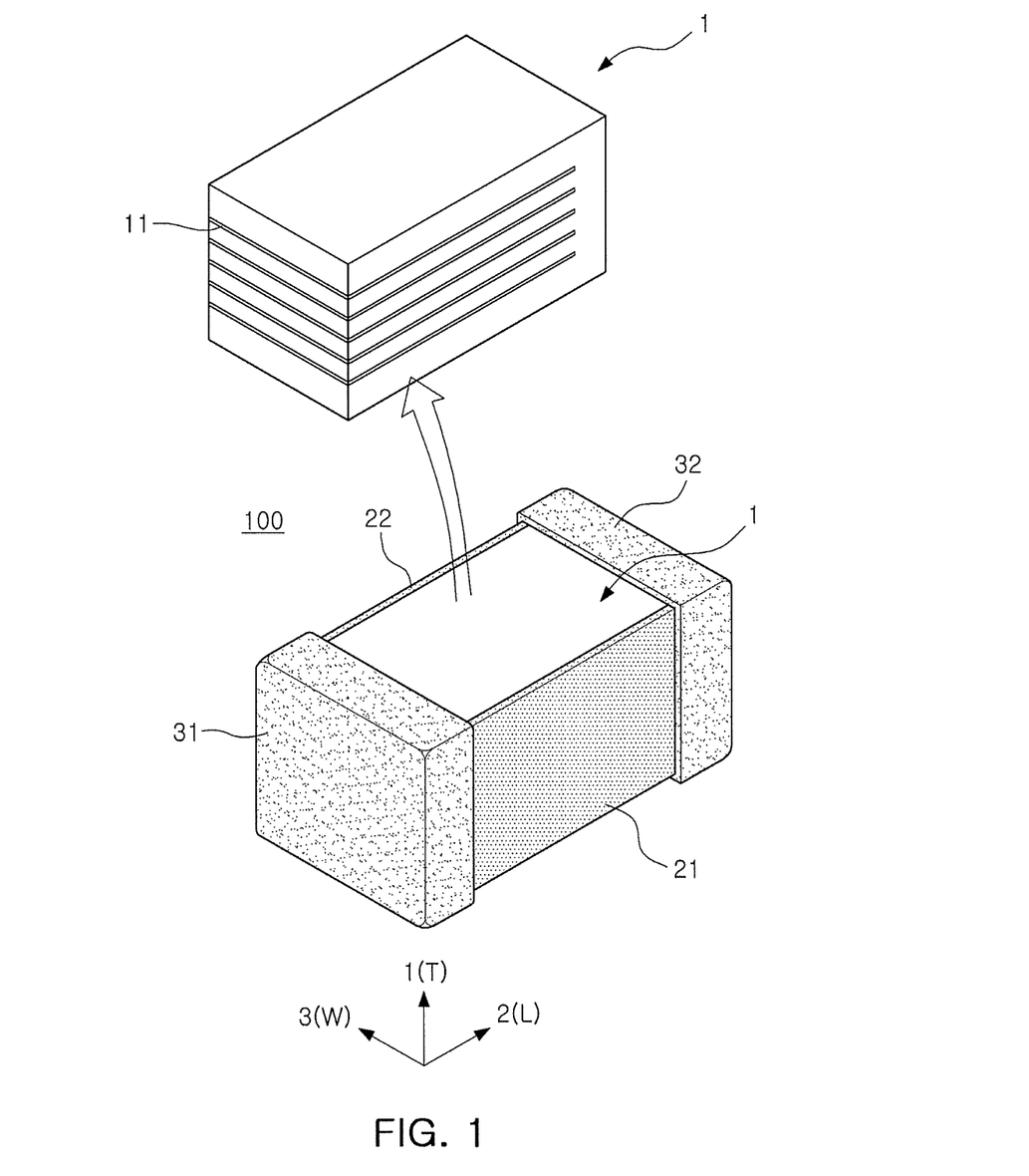
FIG. 1 is a perspective view of a multilayer electronic component according to a first exemplary embodiment.

FIG. 1 is a perspective view of a multilayer electronic component according to a first exemplary embodiment.

Referring to FIG. 1, the multilayer electronic component 100 according to an exemplary embodiment may include a body 1 including a multilayer structure in which first and second internal electrode patterns are alternately stacked and containing a dielectric material, first and second side parts 21 and 22 disposed on outer surfaces of the body to face each other in a third direction of the body, and first and second external electrodes 31 and 32 disposed on outer surfaces of the body to face each other in a second direction of the body.

The body 1 may have six outer surfaces including first and second surfaces opposing each other in a first (e.g., T) direction, third and fourth surfaces opposing each other in the second (e.g., L) direction, and fifth and sixth surfaces opposing each other in the third (e.g., W) direction, to have a substantially hexahedral shape.

Referring to FIG. 1, the first direction refers to a thickness (T) direction of the body, the second direction refers to a length (L) direction of the body, and the third direction refers to a width (W) direction of the body. In this case, in the orientation shown in FIG. 1, the first and second surfaces of the body 1 opposing each other in the first direction of the body 1 may be upper and lower surfaces of the body 1, respectively, but are not necessarily limited thereto.

Referring to FIG. 1, the first and second side parts 21 and 22 may be disposed on the fifth and sixth surfaces of the body opposing each other in the third (W) direction among the outer surfaces of the body 1. The first side part 21 may be disposed to contact the first internal electrode patterns exposed onto the fifth surface of the body 1, and the second side part 22 may also be disposed to contact the first internal electrode patterns exposed onto the sixth surface of the body 1. The first and second side parts 21 and 22 may be disposed in order to prevent the first internal electrode patterns exposed onto the outer surfaces of the body 1 from being damaged due to physical or chemical stress.

According to the related art, in situations in which a multilayer structure includes the first and second internal electrode patterns printed into the body, the first and second internal electrode patterns are generally not exposed to outer surfaces of the body other than the outer surfaces on which the first and second external electrodes 31 and 32 are disposed. Therefore, in such multilayer structures, there is no need to introduce separate first and second side parts.

However, in the multilayer electronic component according to the exemplary embodiment shown in FIG. 1, the first internal electrode patterns may not only be exposed to the outer surface of the body 1 on which the first external electrode 31 is disposed, but may also be exposed to the fifth and sixth outer surfaces of the body 1 opposing each other in the third (W) direction of the body 1. Therefore, the first and second side parts 21 and 22 may be used for preventing edge or end portions of the first internal electrode patterns exposed to the fifth and sixth surfaces from being deformed due to external stress.

Here, the first and second side parts 21 and 22 are not necessarily disposed to respectively cover the entire fifth and sixth surfaces of the body 1. That is, the first and second side parts 21 and 22 may cover only the end portions of the first internal electrode patterns exposed onto the fifth and sixth surfaces of the body 1 without covering the entire fifth and sixth surfaces.

In addition, referring to FIG. 1, the first and second external electrodes 31 and 32 may be disposed on the third and fourth surfaces of the body 1 opposing each other in the second direction (L). The first external electrode 31 may be electrically connected to the first internal electrode patterns within the body 1, and the second external electrode 32 may be electrically connected to the second internal electrode patterns within the body 1.

The first and second external electrodes 31 and 32 may be formed of a material having excellent electrical conductivity, and may serve to electrically connect various patterns as well as the first and second internal electrode patterns and external devices to each other. Therefore, the first and second external electrodes 31 and 32 may contain a material having excellent electrical conductivity, such as Ni, Ag, or Pd, but are not limited thereto.

Next, FIGS. 2A through 2F are schematic cross-sectional views of respective outer surfaces of a body 1 according to an exemplary embodiment. In these figures, internal electrode patterns that are exposed to outer surfaces of the body are denoted by a solid line, and internal electrode patterns that are not exposed to the outer surfaces of the body are denoted by a two-dot chain line.

In detail, FIGS. 2A through 2F are cross-sectional views of the first through sixth surfaces of the body, respectively.

Figure 2A:
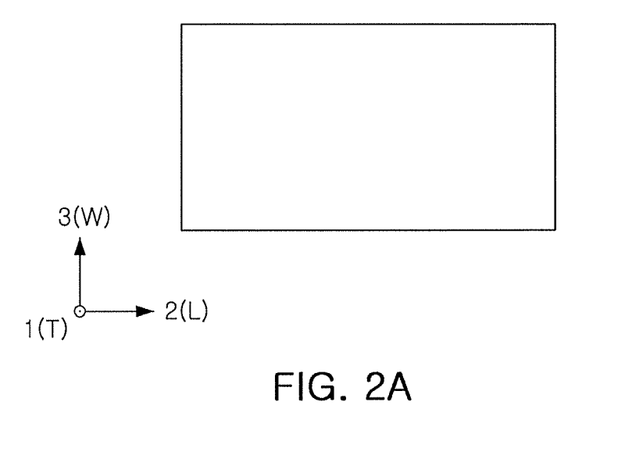
FIGS. 2A through 2F are schematic cross-sectional views of respective surfaces of a body within the multilayer electronic component according to an exemplary embodiment.
Figure 2B:
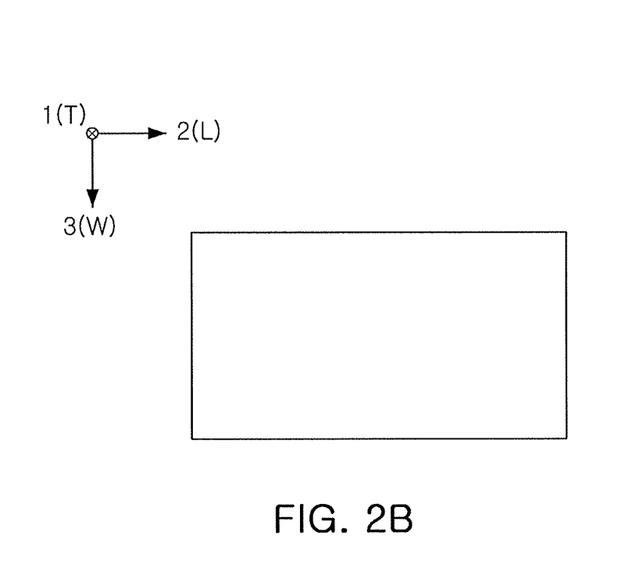

First, FIGS. 2A and 2B illustrate the first and second surfaces of the body 1, respectively. The first and second surfaces of the body 1 may be the upper and lower surfaces of the body, respectively. The upper and lower surfaces of the body 1 may serve as upper and lower cover layers of the body 1 protecting the internal electrode patterns having a multilayer structure within the body 1 from external impact. The upper and lower surfaces of the body 1 may be formed by stacking ten or more ceramic sheets on which the internal electrode patterns are not formed as an example.

Figure 2C:
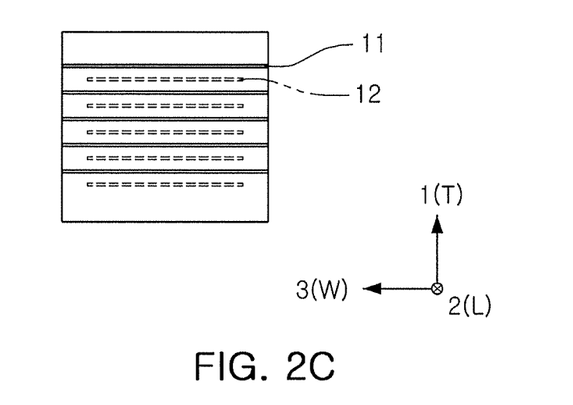

Next, FIG. 2C illustrates the third surface of the body 1. The third surface of the body 1 may be the outer surface of the body 1 on which the first external electrode 31 is disposed. As illustrated in FIG. 2C, the first internal electrode patterns 11 (shown in solid lines) may be exposed to the third surface of the body 1. The first internal electrode patterns 11 may be continuously exposed from one edge (e.g., one end portion, such as the left edge in FIG. 2C) of the third surface of the body 1 to the other edge (e.g., other end portion, such as the right edge in FIG. 2C) of the third surface of the body 1 along the third (W) direction of the body 1. This means that the first internal electrode patterns 11 secure a maximum area for significantly increasing a capacitance value of the multilayer electronic component 100 by increasing a surface area over which the first internal electrode patterns overlap the second internal electrode patterns within the body 1. As shown in FIG. 2C, the second internal electrode patterns 12 (shown in dashed lines) are not exposed to the third surface of the body 11.

Figure 2D:
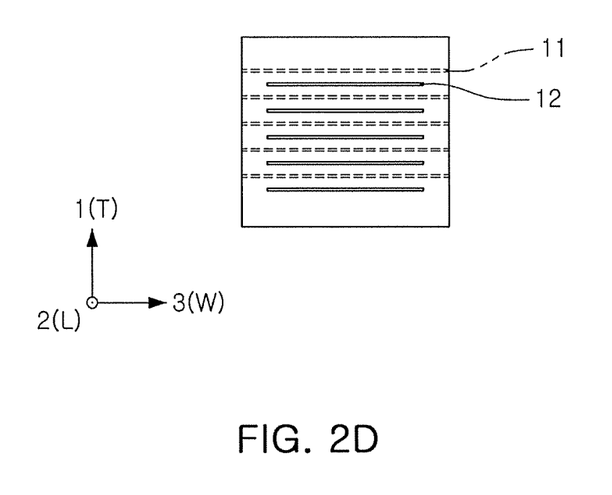

Next, FIG. 2D illustrates the fourth surface of the body 1. The fourth surface of the body 1 may be the outer surface of the body 1 on which the second external electrode 32 is disposed. As illustrated in FIG. 2D, the second internal electrode patterns 12 (shown in solid lines) may be exposed onto the fourth surface of the body 1. The second internal electrode patterns 12 may be continuously exposed from a point spaced apart from one edge (e.g., one end portion) of the fourth surface of the body 1 by a predetermined distance to a point spaced apart from the other opposing edge (e.g., other end portion) of the fourth surface of the body 1 along the third (W) direction of the body 1 by a predetermined distance. By forming the second internal electrode patterns 12 to be spaced away from lateral edges of the body 1, the second internal electrode patterns 12 may not be exposed onto the fifth and sixth surfaces (e.g., lateral surfaces) of the body 1 onto which the first internal electrode patterns 11 are exposed.

Therefore, a risk of generating a short circuit between the first and second internal electrode patterns 11 and 12 on the fifth and sixth surfaces of the body 1 onto which the first internal electrode patterns 11 are exposed may be prevented since the second internal electrode patterns 12 do not extend to the fifth and sixth surfaces.

A distance by which the second internal electrode patterns 12 are spaced apart from both edges (e.g., both end portions) of the fourth surface of the body 1 may be set to be the same as a distance by which the second internal electrode patterns 12 are spaced apart from edges of the fifth and sixth surfaces of the body along the fifth and sixth surfaces of the body. In a case in which only this condition is satisfied, when the distance becomes minimized, an overlapping region as large as possible between the first and second internal electrode patterns 11 and 12 may be secured, and thus capacitance as large as possible may be secured.

Figure 2E:
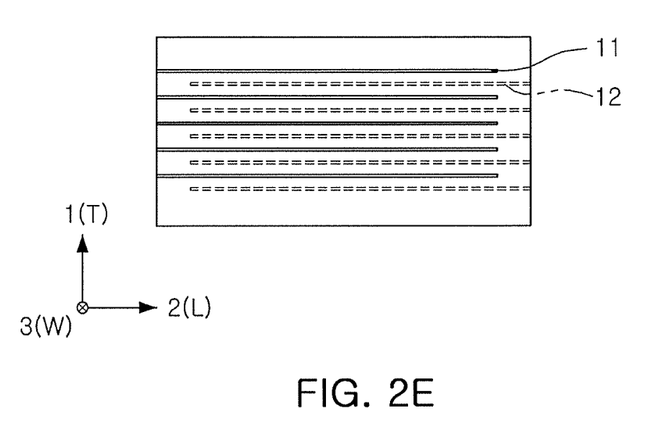

Next, FIG. 2E illustrates the fifth surface of the body 1. The fifth surface of the body may be the outer surface of the body 1 on which the first side part 21 is disposed. As illustrated in FIG. 2E, the first internal electrode patterns 11 (shown in solid lines) may be exposed onto the fifth surface of the body, and the second internal electrode patterns 12 (shown in dashed lines) may not be exposed onto the fifth surface of the body. Since only the first internal electrode patterns 11 are exposed onto the fifth surface of the body, there is no risk that an unintended short circuit between the first and second internal electrode patterns 11 and 12 will be generated.

For example, in situations in which a cutting process is performed along the fifth surface of the body (that is, e.g., in a case in which multiple individual bodies are manufactured by cutting a multilayer bar in which a plurality of ceramic green sheets having internal electrode base patterns printed thereon are alternately stacked), the first and second internal electrode patterns are exposed onto the fifth surface of the body by the cutting process. In such situations, the first and second internal electrode patterns may be pushed or deformed due to stress resulting when the cutting process is performed, and thus there is a risk of a short circuit between the first and second internal electrode patterns.

However, in the multilayer electronic component 100 according to an exemplary embodiment, since only the first internal electrode patterns 11 are exposed onto the fifth surface of the body 1, there is no risk of a short circuit between the first and second internal electrode patterns 11 and 12 even in cases in which the first and second internal electrode patterns are pushed or deformed due to the stress resulting when the cutting process is performed. In addition, in the multilayer electronic component 100 according to an exemplary embodiment, since only the first internal electrode patterns 11 are exposed onto the fifth and sixth surfaces of the body 1, a distance between the first internal electrode patterns 11 in the thickness (T) direction of the body 1 may be larger than a distance between the first and second internal electrode patterns 11 and 12 in a case in which the first and second internal electrode patterns 11 and 12 are alternately exposed onto the fifth and sixth surfaces of the body according to the related art. Therefore, even in the case in which the first and second internal electrode patterns 11 and 12 are pushed or deformed due to the stress when the cutting process is performed, there is no risk of a short circuit between the first and second internal electrode patterns 11 and 12.

In addition, referring to FIG. 2E, the first internal electrode patterns 11 may be extended from one edge (e.g., one end portion) of the fifth surface of the body only to a point spaced apart by a predetermined distance from the other edge (e.g., other end portion) of the fifth surface of the body along the second (L) direction of the body. That is, a total length along which the first internal electrode patterns 11 extend in the second (L) direction of the body 1 may be shorter than a total length of the fifth surface of the body along the second (L) direction.

The predetermined distance can be set to be larger than length separating the second external electrode 12 from the edge of the fourth surface of the body along the fourth surface of the body (as shown in FIG. 2D) (corresponding to the length measured along the fourth surface of the body and separating the second external electrode 12 from the fifth surface of the body), in order to prevent electrical connection between the first internal electrode patterns 11 and the second external electrode 32.

Figure 2F:
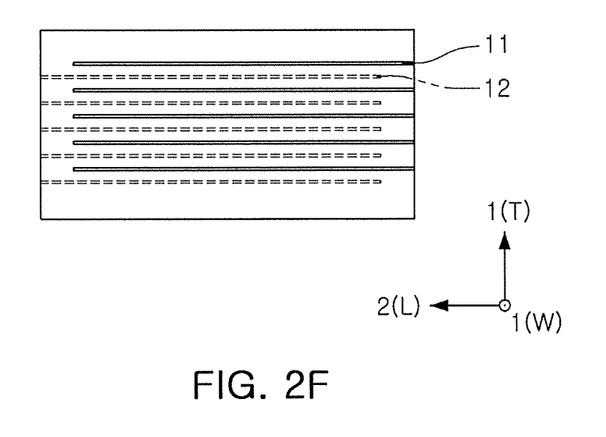

Likewise, FIG. 2F illustrates the sixth surface of the body 1. The sixth surface of the body 1 may be the outer surface of the body on which the second side part 22 is disposed. As illustrated in FIG. 2F, only the first internal electrode patterns 11 (shown in solid lines) may be exposed onto the sixth surface of the body 1, and the second internal electrode patterns 12 (shown in dashed lines) may not be exposed onto the sixth surface of the body 1. Since the sixth surface of the body is substantially symmetrical to the fifth surface of the body opposing the sixth surface of the body in the third (W) direction of the body, the detailed description of the fifth surface may also be applied to the sixth surface of the body. Therefore, a description overlapping that of the fifth surface of the body (discussed above in relation to FIG. 2E) will be omitted.

Figure 3:
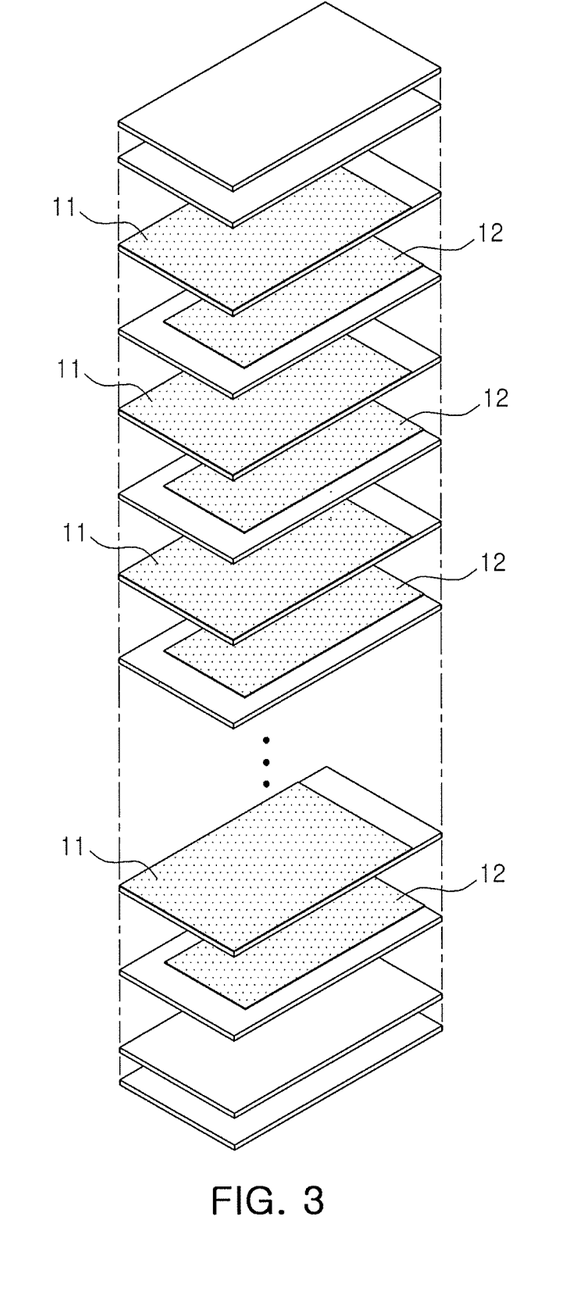
FIG. 3 is an exploded perspective view of internal electrode patterns within the body according to an exemplary embodiment.

FIG. 3 is an exploded perspective view schematically illustrating the first and second internal electrodes 11 and 12 that are alternately stacked on adjacent dielectric layers.

Referring to FIG. 3, the first internal electrode patterns 11 may be disposed to be exposed on all portions of the fifth and sixth surfaces of the body 1 on which the first and second side parts 21 and 22 are disposed, respectively, and on all portions of the third surface of the body 1 on which the first external electrode 21 is disposed. Since the first internal electrode patterns 11 are exposed on both of the fifth and sixth surfaces of the body 1, the first internal electrode patterns 11 may be vulnerable to external physical or chemical stress, but maximum capacitance may be secured. Meanwhile, in order to reduce the vulnerability to physical or chemical stress of the end portions of the first internal electrode patterns 11 exposed onto the fifth and sixth surfaces of the body, the first side part 21 may be disposed to contact the end portions of the first internal electrode patterns 11 exposed onto the fifth surface of the body 1, and the second side part 22 may be disposed to contact the end portions of the first internal electrode patterns 11 exposed onto the sixth surface of the body 1.

In addition, the second internal electrode patterns 12 may include electrode patterns different from the first internal electrode patterns 11. The second internal electrode patterns 12 may be disposed to be exposed onto only the fourth surface of the body (on which the second external electrode 32 is disposed) among the outer surfaces of the body. Since the second internal electrode patterns 12 are not exposed onto the fifth and sixth surfaces of the body (unlike the first internal electrode patterns 11 that alternately overlap the second internal electrode patterns 12 in the first (T) direction of the body), short circuits are prevented from occurring between the first and second internal electrode patterns 11 and 12 due to the first and second internal electrode patterns being pushed or shaken when a cutting process for forming the fifth and sixth surfaces of the body is introduced or when a voltage due to the use of the multilayer electronic component is applied.

Figure 4:
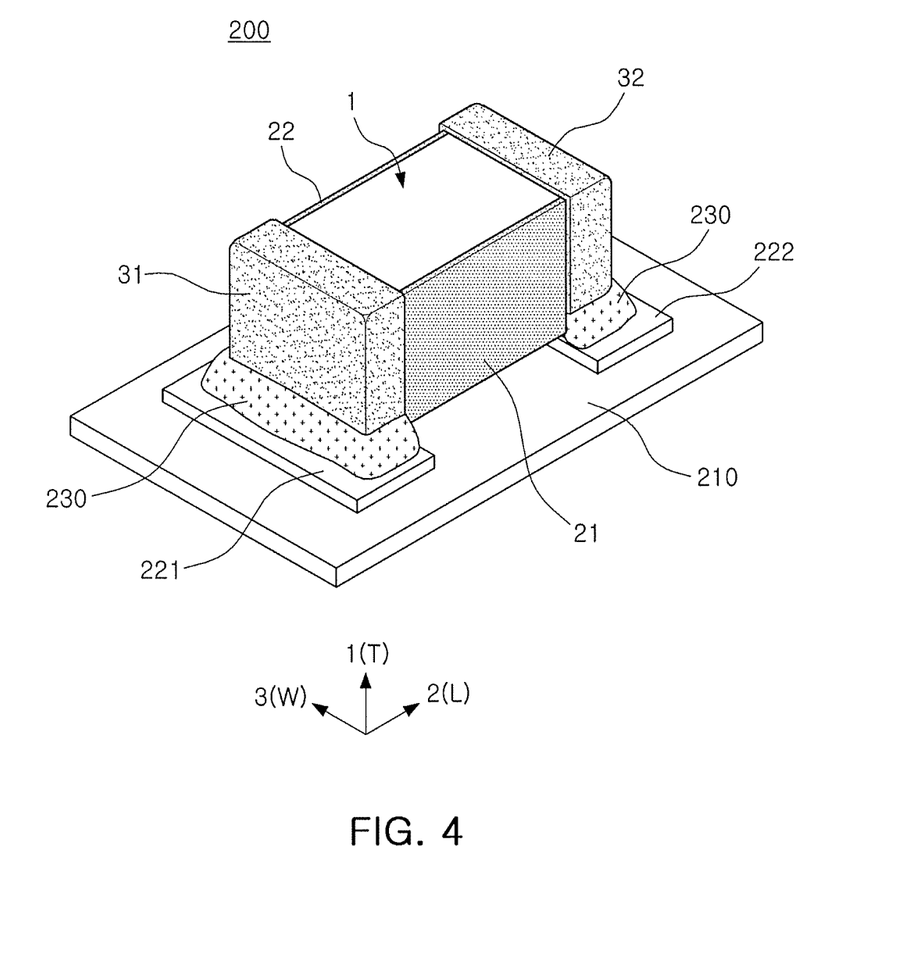
FIG. 4 is a schematic perspective view of a mounting board on which the multilayer electronic component of FIG. 1 is mounted.

FIG. 4 illustrates a mounting board onto which the multilayer electronic component according to an exemplary embodiment is mounted.

Referring to FIG. 4, the mounting board 200 may include a board 210 on which the multilayer electronic component 100 is mounted, and first and second electrode pads 221 and 222 formed on the board 210 to be spaced apart from each other.

Here, the multilayer electronic component 100 may be electrically connected to the board 210 by solders 230 such that the first and second external electrodes 31 and 32 thereof are positioned on and electrically contact the first and second electrode pads 221 and 222, respectively.

Method of Manufacturing Multilayer Electronic Component

Hereinafter, a method of manufacturing a multilayer electronic component according to an exemplary embodiment will be described with reference to FIGS. 5A, 5B, 6A, 6B, and 7 through 9.

Figure 5A:
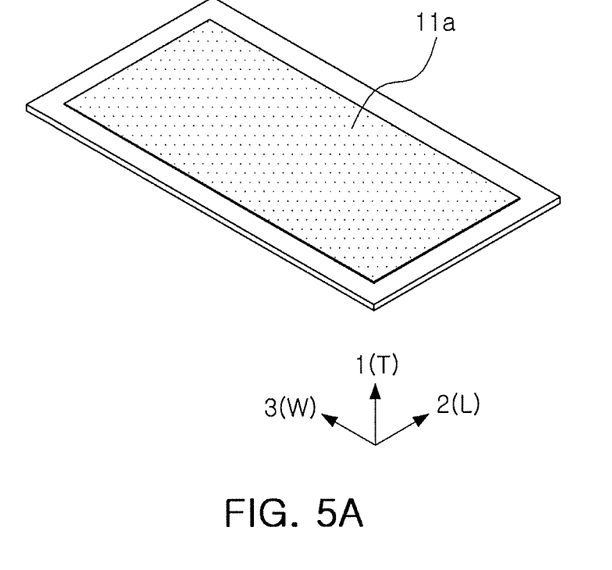
FIGS. 5A and 5B are views illustrating a process of preparing a first internal electrode base pattern in a method of manufacturing a multilayer electronic component according to an exemplary embodiment.
Figure 5B:
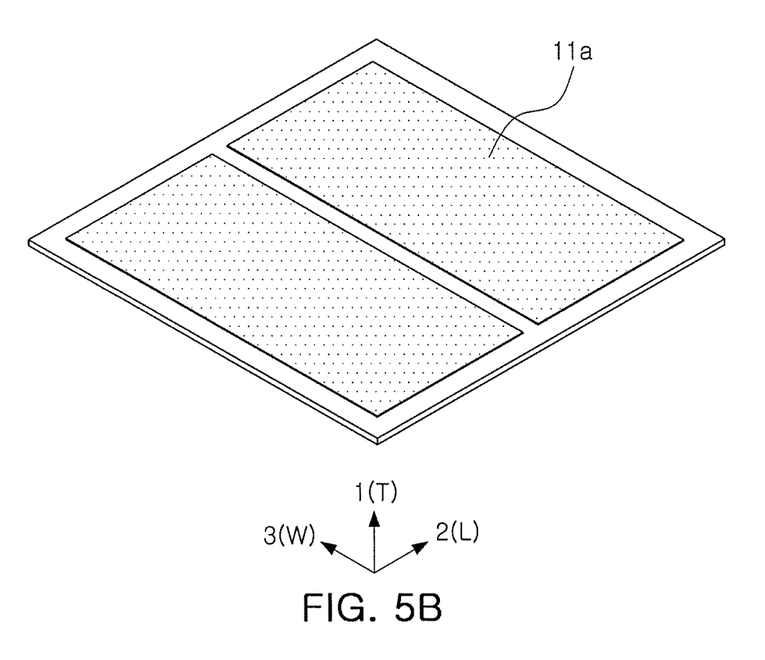

FIGS. 5A and 5B illustrate a first ceramic green sheet on which a first internal electrode base pattern 11a is printed.

First, referring to FIG. 5A, a slurry containing a powder having a dielectric property, a binder, and a solvent may be applied onto a substrate such as a carrier film to form a first ceramic green sheet, and the first internal electrode base pattern 11a may be printed on the first ceramic green sheet.

The powder having the dielectric property, which is a high-k material, may be a barium titanate based material, a lead composite perovskite based material, a strontium titanate based material, or the like, and may preferably be a barium titanate powder, but is not limited thereto.

The purpose of the binder may be to secure dispersibility and viscosity of the powder having the dielectric property, and viscosity of the slurry may be adjusted by adjusting an amount of the binder. The binder may be an organic binder resin, for example, a resin such as ethyl cellulose, polyvinyl butyral, and the like, but is not limited thereto.

The first internal electrode base pattern 11a may be formed of a conductive metal having excellent electrical conductivity, and may contain one or more selected from the group consisting of Ag, Ni, Cu, Pd, and alloys thereof, but is not limited thereto.

The first internal electrode base pattern 11a may have a strip shape covering the entire region of the first ceramic green sheet extended in a width direction of the first ceramic green sheet. Meanwhile, the first internal electrode base pattern 11a may not be printed on or extend to at least one edge (e.g., one end portion) of the first ceramic green sheet in a length direction of the first ceramic green sheet. In this case, the first internal electrode pattern 11a may not be exposed to or extend to the outer surface of the body on which the second external electrode 32 is disposed without performing an additional cutting process later.

In addition, referring to FIG. 5B, the first internal electrode base pattern 11a may be disposed on the first ceramic green sheet to have a plurality of strip shapes. The plurality of strip shapes may be disposed to be spaced apart from each other by a predetermined interval in the length direction of the first ceramic green sheet.

Figure 6A:
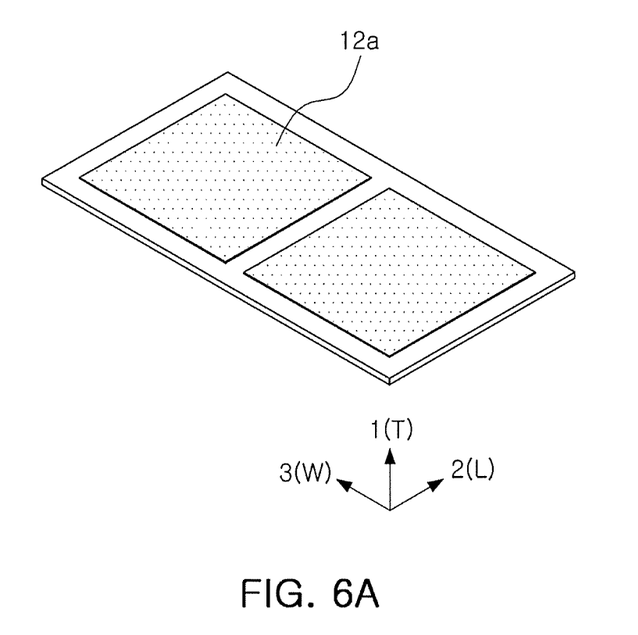
FIGS. 6A and 6B are views illustrating a process of preparing a second internal electrode base pattern in a method of manufacturing a multilayer electronic component according to an exemplary embodiment.

First, referring to FIG. 6A, a slurry containing a powder having a dielectric property, a binder, and a solvent may be applied onto a substrate such as a carrier film to form a second ceramic green sheet, and a second internal electrode base pattern 12a may be printed on the second ceramic green sheet. The powder having the dielectric property, which is a high-k material, may be a barium titanate based material, a lead composite perovskite based material, a strontium titanate based material, or the like, and may preferably be a barium titanate powder, but is not limited thereto.

The binder may be to secure dispersibility and viscosity of the powder having the dielectric property, and viscosity of the slurry may be adjusted by adjusting an amount of the binder. The binder may be an organic binder resin, for example, a resin such as ethyl cellulose, polyvinyl butyral, and the like, but is not limited thereto.

The second internal electrode base pattern 12a may be formed of a conductive metal having excellent electrical conductivity, and may contain one or more selected from the group consisting of Ag, Ni, Cu, Pd, and alloys thereof, but is not limited thereto.

As illustrated in FIG. 6A, the second internal electrode base pattern 12a may have a lattice shape exposing at least some of a region extending in a width direction of the second ceramic green sheet. For example, the second internal electrode base pattern 12a may have the lattice shape in which two square patterns are disposed to be spaced apart from each other by a predetermined distance in the width direction of the second ceramic green sheet. Meanwhile, the second internal electrode base pattern 12a may preferably be printed on at least one end portion region of the second ceramic green sheet in the length direction of the second ceramic green sheet, corresponding to a region overlapping one end portion of the first ceramic green sheet on which the first internal electrode base pattern is not printed. In this case, the second internal electrode pattern 12a may not be exposed to or extend to the outer surface of the body on which the first external electrode 31 is disposed without performing an additional cutting process later.

Figure 6B:
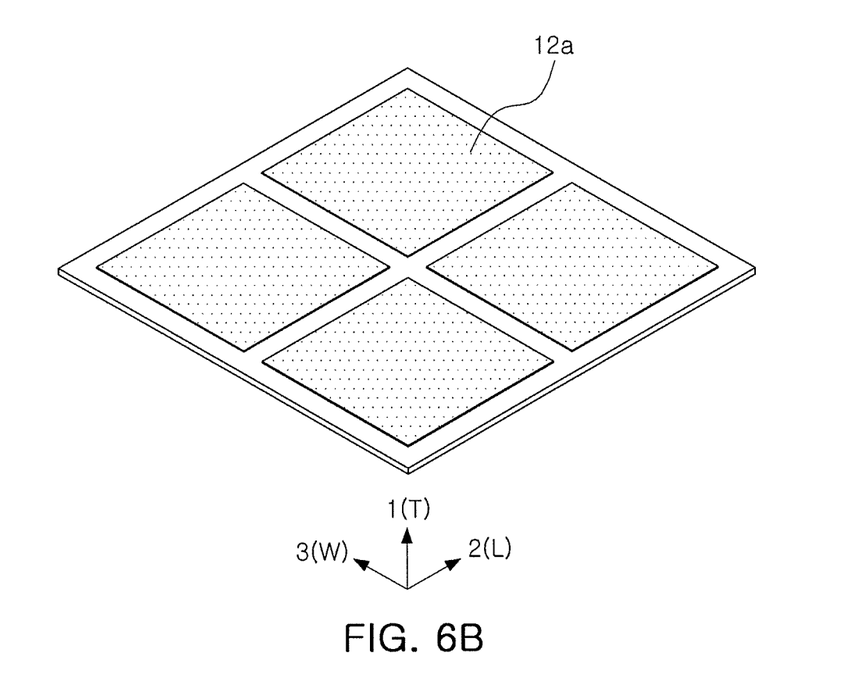

Meanwhile, referring to FIG. 6B, the second internal electrode base pattern 12a may be disposed on the second ceramic green sheet to have a plurality of lattice shapes. The plurality of lattice shapes may be disposed to be spaced apart from each other by a predetermined interval in the length direction of the second ceramic green sheet. In this case, the second internal electrode base pattern 12a may have a lattice shape in which a plurality of square patterns are disposed to be spaced apart from each other by predetermined intervals in the width direction and the length direction.

Figure 7:
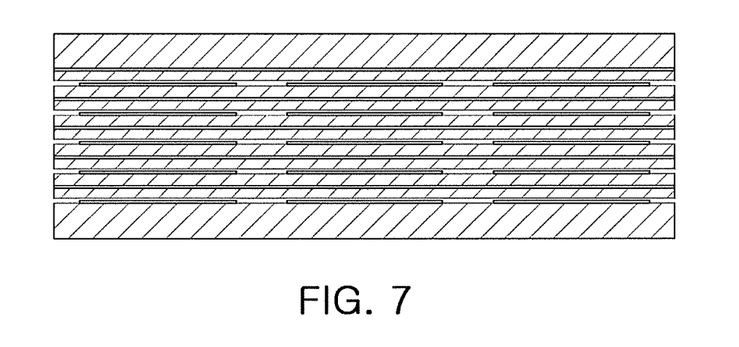
FIG. 7 is a view illustrating a process of preparing a multilayer bar of first and second ceramic green sheets in the method of manufacturing a multilayer electronic component according to an exemplary embodiment.

Next, referring to FIG. 7, the first ceramic green sheets on which the first internal electrode base patterns 11a are printed and the second ceramic green sheets on which the second internal electrode base patterns 12a are printed may be alternately stacked in the first direction (thickness direction).

In this case, it may be preferable that the multilayer bar of the first and second ceramic green sheets is prepared by alternately stacking the first ceramic green sheets having the first internal electrode base patterns 11a printed thereon, illustrated in FIG. 5A, and the second ceramic green sheets having the second internal electrode base patterns 12a printed thereon, illustrated in FIG. 6A. Alternately, forming the multilayer bar may involve stacking the first ceramic green sheets having the first internal electrode base patterns 11a printed thereon, illustrated in FIG. 5B, and the second ceramic green sheets having the second internal electrode base patterns 12a printed thereon, illustrated in FIG. 6B.

As illustrated in FIG. 7, a region in which the second internal electrode base patterns 12a are not printed on the second ceramic green sheets in the multilayer bar of FIG. 7 may form a space opened in a length direction of the multilayer bar. The space may be a space in which a dielectric ceramic slurry is provided through a process of compressing the multilayer bar which is performed after the stacking process.

Meanwhile, the space in which the dielectric ceramic slurry is to be provided through the process of compressing the multilayer bar (shown as the open space adjacent to the second internal electrode base patterns 12a of FIG. 7) may be called a margin region.

Figure 8:
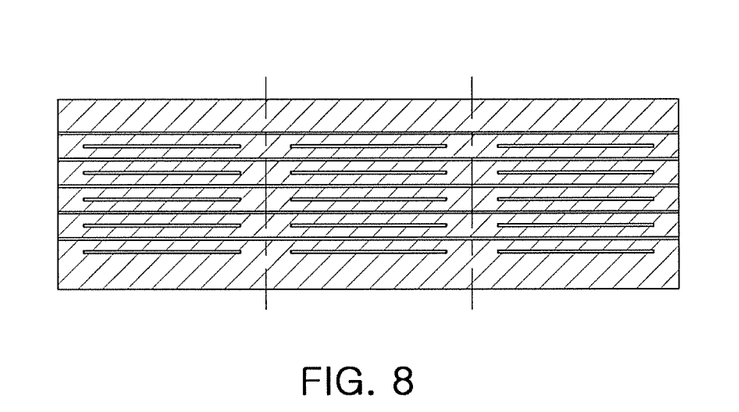
FIG. 8 is a view illustrating a process of compressing and cutting the multilayer bar of FIG. 7.

Next, referring to FIG. 8, the multilayer bar of the first and second ceramic green sheets may be compressed and cut into individual chips.

A process of cutting the multilayer bar of the first and second ceramic green sheets will be described in detail. The first internal electrode base patterns 11a in the multilayer bar and some of the margin region in which the second internal electrode base patterns 12a are not printed on the second ceramic green sheets in the multilayer bar may be simultaneously cut. The multilayer bar may be cut so that only the first internal electrode base patterns 11a (among the first and second internal electrode base patterns 11a and 12a) are exposed onto cutting surfaces (corresponding to the fifth and sixth surfaces of the body) of the multilayer bar. In this case, when the cutting process is performed, only end portions of the first internal electrode base patterns 11a may contact the cutting surfaces, and the second internal electrode base patterns 12a may not contact the cutting surfaces. For example, cutting may be performed along the dashed lines of FIG. 8.

As a result of the second internal electrode base patterns 12a not contacting the cutting surfaces, detrimental short circuits between the first and second internal electrode patterns 11a and 12a are be prevented by ensuring that edge portions of the first and second internal electrodes 11a and 12a are not pushed together in a process of cutting the multilayer bar into individual chips.

In this case, it may be sufficient to cut the multilayer bar at locations where the first internal electrode base patterns 11a overlap the margin region on the second ceramic green sheets on which the second internal electrode base patterns 12a are not printed. However, it may be preferable to cut the multilayer bar at locations central to the portion of the margin region on the second ceramic green sheets, in consideration of efficiency in a manufacturing process and economical efficiency.

The body 1 includes the multilayer structure in which the first and second internal electrode patterns 11 and 12 are alternately stacked. The body 1 further contains the dielectric material, has outer surfaces including the first through sixth surfaces, and may be formed through the cutting process. The first and second surfaces of the outer surfaces of the body 1 may be the upper and lower surfaces, respectively; the third and fourth surfaces of the body 1 may be surfaces of the body on which the first and second external electrodes 31 and 32 facing each other are disposed, respectively; and the fifth and sixth surfaces of the body 1 may be the cutting surfaces where the cutting process is performed. The third and fourth surfaces of the body may or may not be outer surfaces to which the cutting process is applied during the process of forming the body 1. The reason for this is that the cutting process may not be needed along the third and fourth surfaces, notably in embodiments in which the first internal electrode base patterns 11a are disposed on one end portion of the first ceramic green sheets in the length direction of the first ceramic green sheets, and in which the second internal electrode base patterns 12a are disposed on one end portion of the second ceramic green sheets in the length direction of the second ceramic green sheets. In such embodiments, the first and second internal electrode base patterns are overlapped with each other when the first and second ceramic green sheets are alternately stacked.

Figure 9:
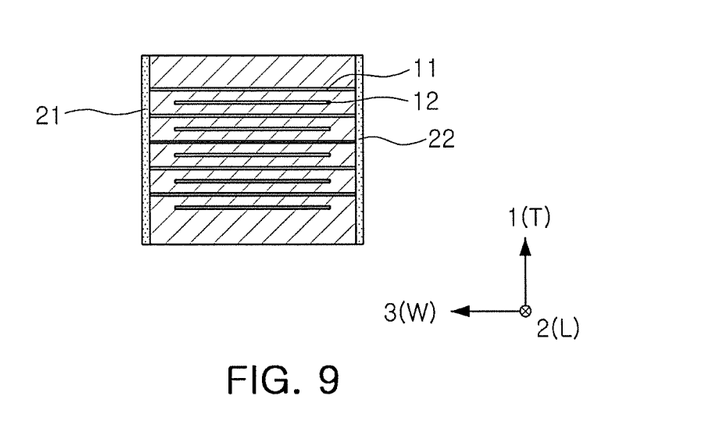
FIG. 9 is a view illustrating a process of disposing first and second side parts on outer surfaces of the body.

Referring to FIG. 9, the first and second side parts 21 and 22 may be disposed on the fifth and sixth surfaces of the body 1, respectively. Only the first internal electrode patterns 11 (among the first and second internal electrode patterns) may be exposed onto the fifth surface of the body 1, and only the first internal electrode patterns 11 (among the first and second internal electrode patterns) may also be exposed onto the sixth surface of the body 1. The first and second side parts 21 and 22 may be formed by applying a slurry to protect the end portions of the first internal electrode patterns 11 exposed onto the fifth and sixth surfaces of the body 1, respectively, from physical or chemical stress. Since the first and second side parts 21 and 22 are disposed on only the fifth and sixth surfaces of the body, respectively, by selectively applying the slurry onto only the fifth and sixth surfaces of the body, thicknesses in the first and second surfaces of the body 1 may not be affected by the application of the slurry.

Meanwhile, in order to selectively apply the slurry onto only the fifth and sixth surfaces of the body 1, for example, a method of attaching detachable films onto the outer surfaces of the body other than the fifth and sixth surfaces of the body. The body (having the detachable films on first through fourth outer surfaces thereof) may then be dipped into the slurry, and the detachable films attached onto the outer surfaces of the body may then be removed. However, a method of applying the slurry onto only the fifth and sixth surfaces of the body is not limited thereto.

The slurry forming the first and second side parts 21 and 22 may contain the powder having the dielectric property, the binder, and the organic solvent.

In this case, the first side part 21 may be formed or disposed by applying a first slurry containing a solvent compatible with a binder contained in an electrode paste forming the second internal electrode base pattern 12a onto the outer surface of the body 1, and the second side part 22 may be disposed by applying a second slurry containing a solvent compatible with a binder contained in an electrode paste forming the first internal electrode base pattern 11a onto the outer surface of the body 1. This structure is possible since the first side part 21 and the second internal electrode patterns 12a do not contact each other and the second side part 22 and the first internal electrode pattern 11a do not contact each other.

Next, the first and second external electrodes 31 and 32 may be disposed on the third and fourth surfaces of the body 1, respectively. The first external electrode 31 may be electrically connected to the first internal electrode patterns 11, and may be disposed to be extended to some regions of the first, second, fifth, and sixth surfaces of the body 1 adjacent to the third surface of the body 1, in addition to the third surface of the body 1. Likewise, the second external electrode 32 may be electrically connected to the second internal electrode patterns 12, and may be disposed to be extended to some of regions of the first, second, fifth, and sixth surfaces of the body adjacent to the fourth surface of the body 1, in addition to the fourth surface of the body 1.

A description of features overlapping those of the multilayer electronic component 100 according to the exemplary embodiment described above except for the above-mentioned description will be omitted.

As set forth above, according to an exemplary embodiment in the present disclosure, a multilayer electronic component is provided having capacitance that is increased by significantly increasing an active region contributing to generation of capacitance in disposing internal electrode patterns of the multilayer electronic component. A method of manufacturing the same is additionally provided.

According to an exemplary embodiment in the present disclosure, a multilayer electronic component in which short circuits between internal electrodes alternately formed between a plurality of sheets are prevented, and a method of manufacturing the same, may be provided.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including a multilayer structure in which first internal electrode patterns and second internal electrode patterns different from the first internal electrode patterns are alternately stacked and containing a dielectric material;
first and second side parts disposed on respective outer surfaces of a first pair of opposing outer surfaces of the body; and
first and second external electrodes disposed on respective outer surfaces of a second pair of opposing outer surfaces of the body, the first and second external electrodes electrically connected to the first and second internal electrode patterns, respectively,
wherein the first internal electrode patterns are exposed to the outer surfaces of the first pair of outer surfaces of the body on which the first and second side parts are disposed, and
wherein at least one of the first or second side parts extends from an edge of a corresponding outer surface towards, without reaching, an opposing edge of the corresponding outer surface.

2. The multilayer electronic component of claim 1, wherein the second internal electrode patterns are disposed in the body to be spaced apart by a predetermined interval from the first and second side parts.

3. The multilayer electronic component of claim 1, wherein the first internal electrode patterns are exposed to the outer surface of the body on which the first external electrode is disposed, and exposed portions of the first internal electrode patterns extend from one edge to an opposing edge of the outer surface of the body on which the first external electrode is disposed.

4. The multilayer electronic component of claim 1, wherein the second internal electrode patterns are exposed to only the outer surface of the body on which the second external electrode is disposed among the outer surfaces of the body, and exposed portions of the second internal electrode patterns on the outer surface of the body on which the second external electrode is disposed extend from a point spaced apart by a predetermined distance from one edge on the outer surface of the body on which the second external electrode is disposed to a point spaced apart by the predetermined distance from another edge on the outer surface of the body.

5. The multilayer electronic component of claim 1, wherein the first and second side parts cover all portions of the first internal electrode patterns exposed to the outer surfaces of the first pair of outer surfaces of the body on which the first and second side parts are disposed.

6. The multilayer electronic component of claim 1, wherein the body includes first and second surfaces opposing each other in a first direction, third and fourth surfaces opposing each other in a second direction, and fifth and sixth surfaces opposing each other in a third direction,
the first and second internal electrode patterns are disposed in parallel with the first and second surfaces opposing each other in the first direction and disposed perpendicularly to the third, fourth, fifth, and sixth surfaces,
the first and second side parts are respectively disposed on the fifth and sixth surfaces opposing each other in the third direction and forming the first pair of outer surfaces of the body, and
the first and second external electrodes are respectively disposed on the third and fourth surfaces opposing each other in the second direction and forming the second pair of outer surfaces of the body.

7. The multilayer electronic component of claim 1, wherein a length of the first internal electrode pattern exposed onto the outer surface of the body on which the first external electrode is disposed among the outer surfaces of the body is longer than a length of the second internal electrode pattern exposed onto the outer surface of the body on which the second external electrode is disposed.

8. The multilayer electronic component of claim 1, wherein the first side part is disposed on the outer surface of the body to contact only the first internal electrode patterns of the first and second internal electrode patterns.

9. The multilayer electronic component of claim 1, wherein the first and second side parts include a powder having a dielectric property.

10. A method of manufacturing a multilayer electronic component, the method comprising:
forming first and second ceramic green sheets using a slurry containing a powder having a dielectric property, a binder, and a solvent;
printing a first internal electrode base pattern on one surface of the first ceramic green sheet;
printing a second internal electrode base pattern on one surface of the second ceramic green sheet such that a margin region of the second ceramic green sheet remains free of the second internal electrode base pattern, wherein the margin region includes two end portion regions of the second ceramic green sheet opposite to each other in a width direction of the second ceramic green sheet and at least a partial region between the two end portion regions of the second ceramic green sheet, and the second internal electrode base pattern is different from the first internal electrode base pattern;
stacking the first ceramic green sheet including the first internal electrode base pattern and the second ceramic green sheet including the second internal electrode base pattern in a thickness direction to form a multilayer bar;
cutting the multilayer bar in which the first and second ceramic green sheets are stacked to form bodies including a multilayer structure in which first and second internal electrode patterns are stacked and containing a dielectric material;
disposing first and second side parts on a first pair of opposing outer surfaces of each body of the bodies formed by the cutting; and
disposing first and second external electrodes on a second pair of opposing outer surfaces of each body,
wherein at least one of the first or second side parts extends from an edge of a corresponding outer surface towards, without reaching, an opposing edge of the corresponding outer surface.

11. The method of claim 10, wherein the first internal electrode base pattern includes two or more strips covering a region of the first ceramic green sheet extended in the width direction of the first ceramic green sheet, the two or more strips being disposed to be spaced apart from each other by a predetermined interval in a length direction of the first ceramic green sheet.

12. The method of claim 10, wherein the second internal electrode base pattern includes two or more lattices in which at least some of the region extended in the width direction of the second ceramic green sheet remains free of the second internal electrode base pattern, the two or more lattices being disposed to be spaced apart from each other by a predetermined interval in a length direction of the second ceramic green sheet.

13. The method of claim 10, wherein in the multilayer bar in which the first and second ceramic green sheets are stacked, a slurry is provided in the margin region on the second ceramic green sheet.

14. The method of claim 10, wherein the multilayer bar is cut at a location in which the first internal electrode base pattern on the first ceramic green sheet overlays some of the margin region on the second ceramic green sheet in the multilayer bar in which the first and second ceramic green sheets are stacked.

15. The method of claim 10, wherein at least one of the first and second side parts is disposed on an outer surface of the first pair of outer surfaces of each body to contact end portions of the first internal electrode patterns, and the outer surfaces of the bodies on which the at least one of the first and second side parts is disposed are surfaces along which the multilayer bar was cut.

16. The method of claim 10, wherein the multilayer bar is cut along a central portion of the margin region of the second ceramic green sheet in the multilayer bar in which the first and second ceramic green sheets are stacked.

17. A multilayer electronic component comprising:
a multilayer structure in which pluralities of first internal electrode patterns and second internal electrode patterns different from the first internal electrode patterns are alternately stacked and containing a dielectric material; and
first and second side parts and first and second external electrodes disposed on respective outer surfaces of the multilayer structure,
wherein each of the plurality of first internal electrode patterns extends to at least three outer surfaces of the multilayer structure, and each of the plurality of second internal electrode patterns extends to only one outer surface of the multilayer structure, and
wherein at least one of the first or second side parts extends from an edge of a corresponding outer surface towards, without reaching, an opposing edge of the corresponding outer surface.

18. The multilayer electronic component of claim 17, wherein each of the plurality of first internal electrode patterns extends to a first pair of opposing outer surfaces of the multilayer structure on which the first and second side parts are disposed and to an outer surface of the multilayer structure on which the first external electrode is disposed, and
each of the plurality of second internal electrode patterns extends to an outer surface of the multilayer structure on which the second external electrode is disposed.

19. The multilayer electronic component of claim 17, wherein the multilayer structure has a hexahedral shape,
each of the plurality of first internal electrode patterns has a rectangular shape that extends to first, second and third outer surfaces of the hexahedral shaped multilayer structure and is spaced apart from a fourth outer surface of the hexahedral shaped multilayer structure, and
each of the plurality of second internal electrode patterns has a rectangular shape that extends to the fourth outer surface of the hexahedral shaped multilayer structure and is spaced apart from the first, second, and third outer surfaces of the hexahedral shaped multilayer structure.

20. The multilayer electronic component of claim 19, wherein each of the pluralities of first and second internal electrode patterns are stacked to be parallel to opposing fifth and sixth outer surfaces of the hexahedral shaped multilayer structure.

21. A multilayer electronic component comprising:
a ceramic body including a dielectric material and pluralities of first internal electrode patterns and second internal electrode patterns different from the first internal electrode patterns alternately stacked in the dielectric material, the ceramic body having four side surfaces and a bottom surface and a top surface;
first and second side parts disposed on two opposing side surfaces of the ceramic body among the four side surfaces; and
first and second external electrodes disposed on the two remaining opposing side surfaces of the ceramic body,
wherein each of the plurality of first internal electrode patterns extends to the two opposing side surfaces of the ceramic body and only one of the two remaining opposing side surfaces of the ceramic body, and each of the plurality of second internal electrode patterns extends to the other one of the two remaining opposing side surfaces of the ceramic body, and
wherein at least one of the first or second side parts extends from an edge of a corresponding side surface towards, without reaching, an opposing edge of the corresponding side surface.

22. The multilayer electronic component of claim 21, wherein each of the plurality of second internal electrode patterns extends only to the other one of the two remaining opposing side surfaces of the ceramic body among the four side surfaces of the ceramic body.

23. The multilayer electronic component of claim 21, wherein the first and second external electrodes each extend to the side surfaces of the ceramic body, and the second external electrode electrically contacts each of the plurality of second internal electrode patterns only on the other one of the two remaining opposing side surfaces of the ceramic body.

24. The multilayer electronic component of claim 21, wherein the first and second side parts are insulating parts.

25. The multilayer electronic component of claim 21, wherein each of the plurality of second internal electrode patterns is disposed in the ceramic body to be spaced apart by a predetermined interval from the two opposing side surfaces of the ceramic body having the first and second side parts disposed thereon.

26. The multilayer electronic component of claim 25, wherein each of the plurality of second internal electrode patterns is disposed in the ceramic body to be spaced apart by the predetermined interval from the only one of the two remaining opposing side surfaces of the ceramic body having the first external electrode disposed thereon, and
each of the plurality of first internal electrode patterns is disposed in the ceramic body to be spaced apart by the predetermined interval from the other one of the two remaining opposing side surfaces of the ceramic body having the second external electrode disposed thereon.

* * * * *